(Model.)
R. BROWN.
GRAIN BINDER.
No. 266,087. Patented Oct. 17, 1882.
5 Sheets—Sheet 1.
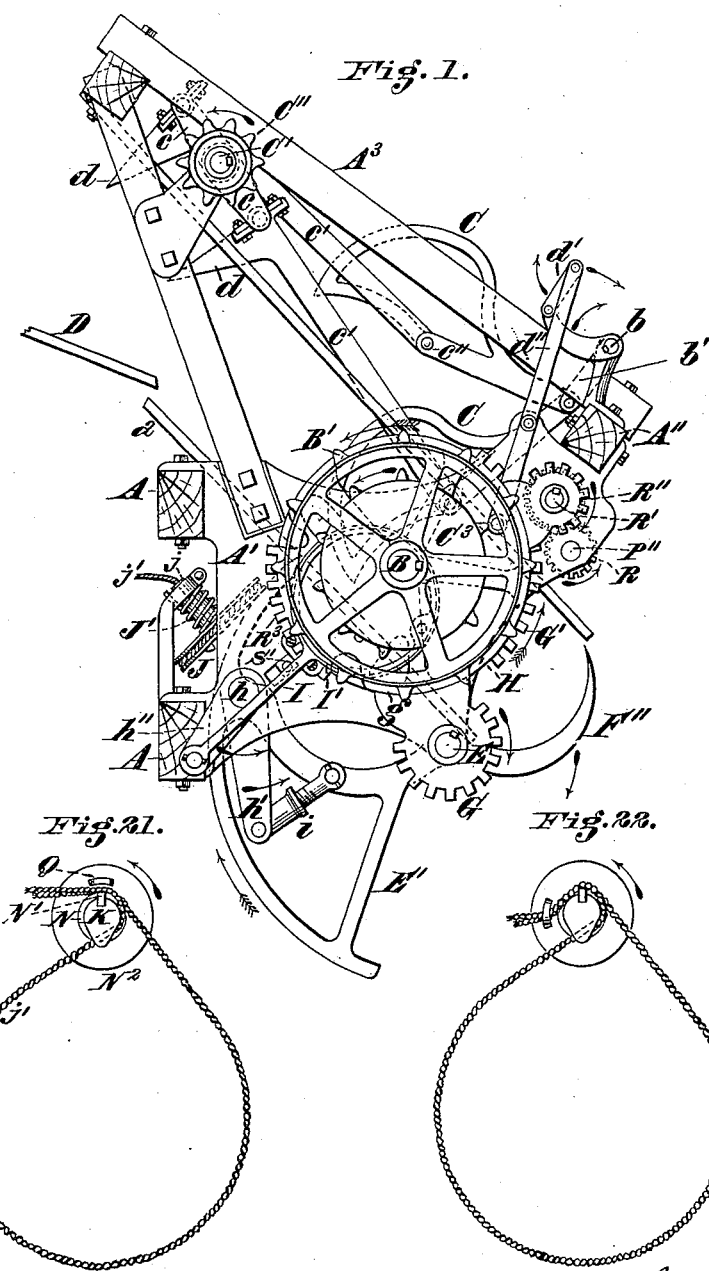
Attest
Jno. S. Jones
Herbert P. Cook
Inventor
Robert Brown
by Wood & Boyd
his Attorneys

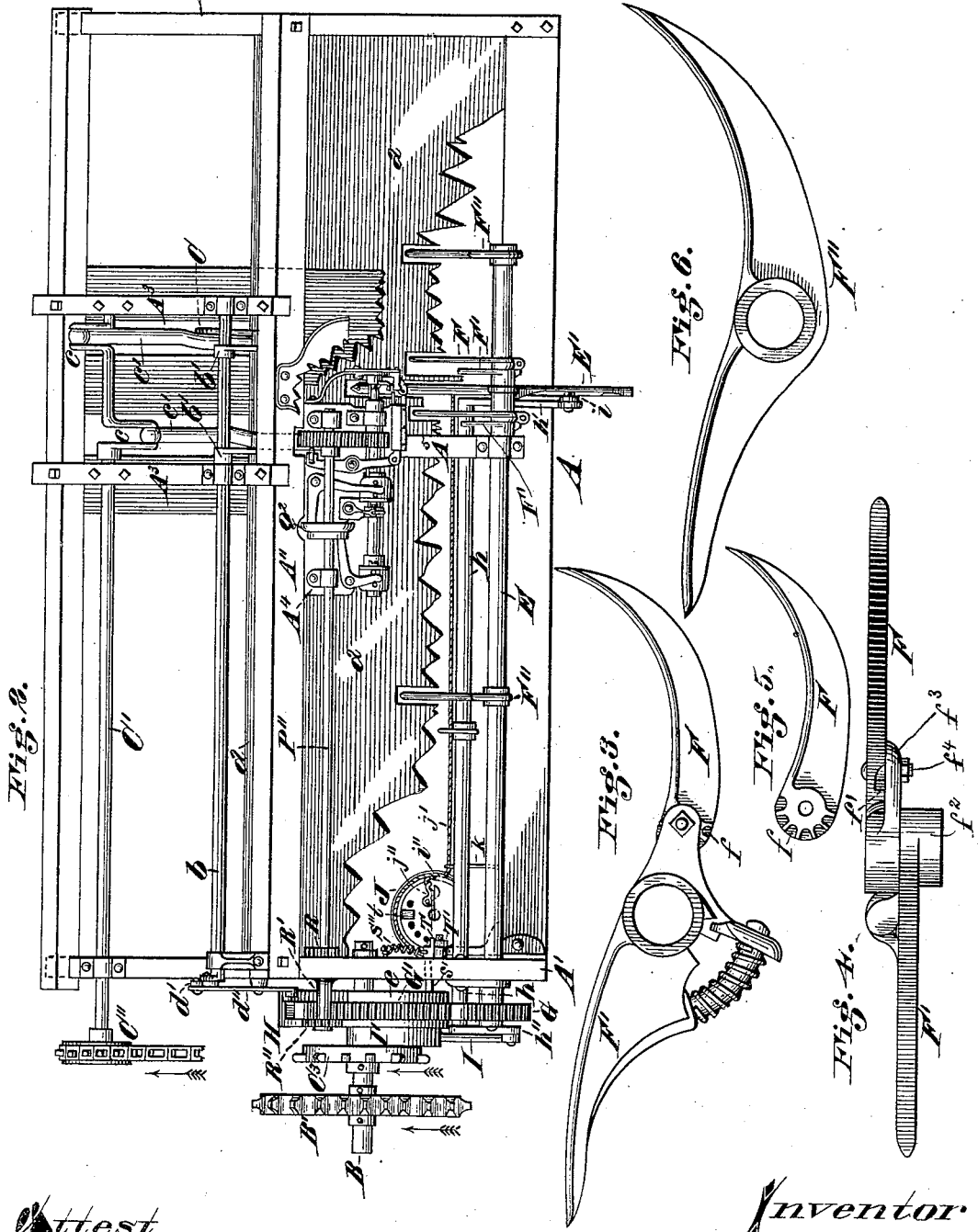

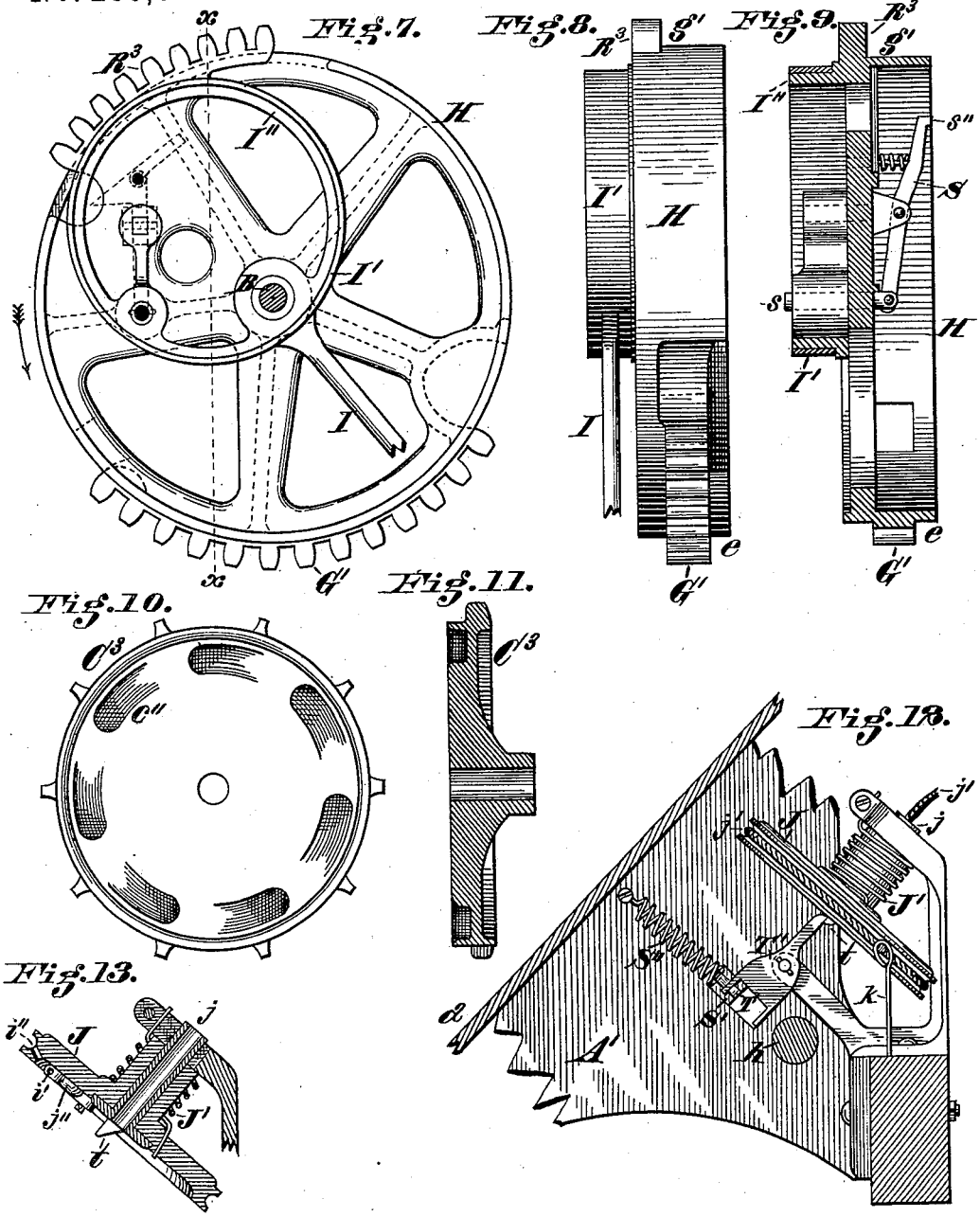

(Model.)
R. BROWN.
GRAIN BINDER.
No. 266,087.
5 Sheets—Sheet 4.
Patented Oct. 17, 1882.
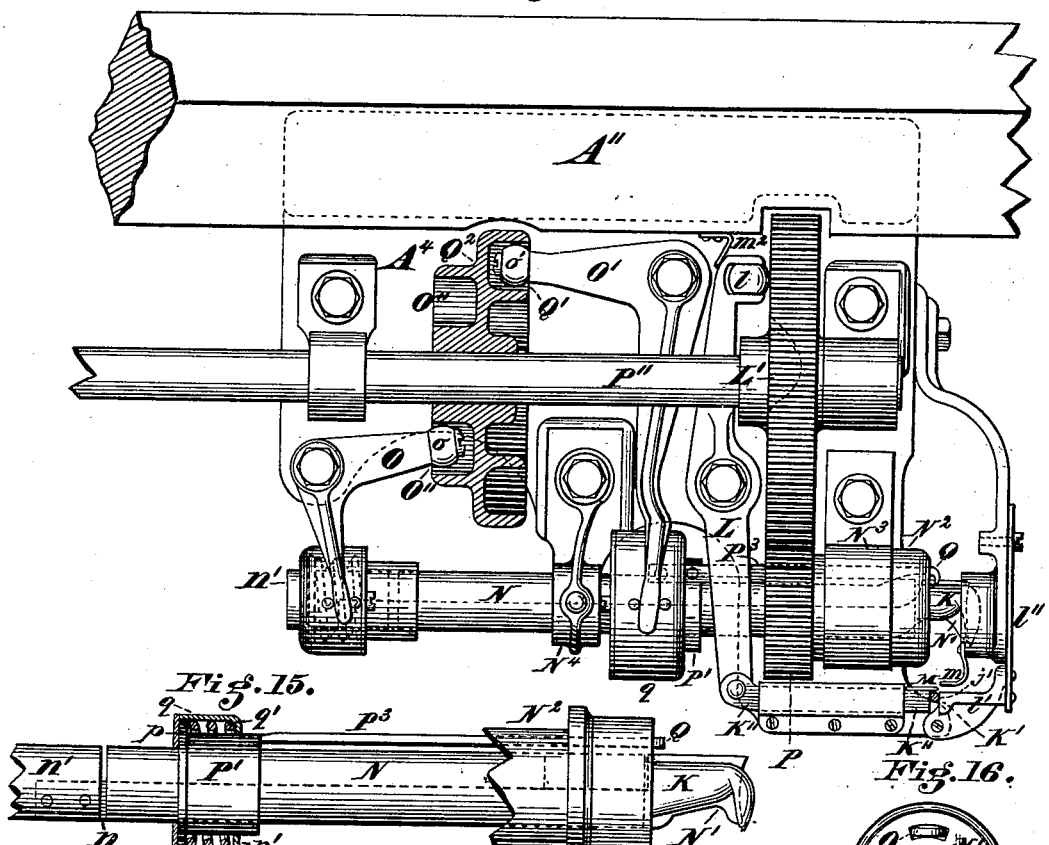
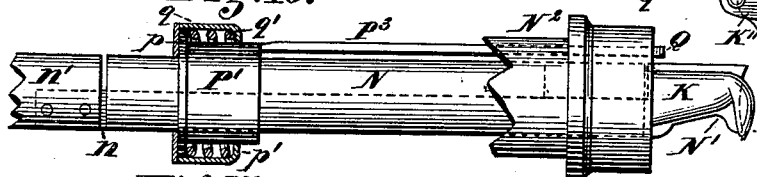
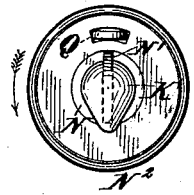
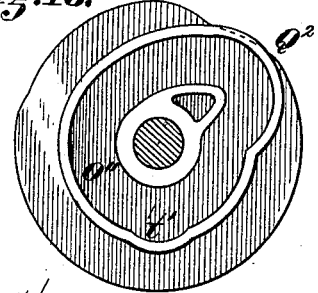
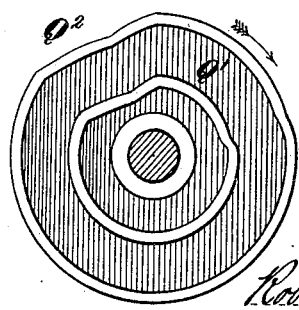
Attest
Jno. E. Jones
Herbert P. Cook
Inventor
Robert Brown,
by Wood & Boyd
his Attorneys (Model.)
R. BROWN.
GRAIN BINDER.
No. 266,087. Patented Oct. 17, 1882.
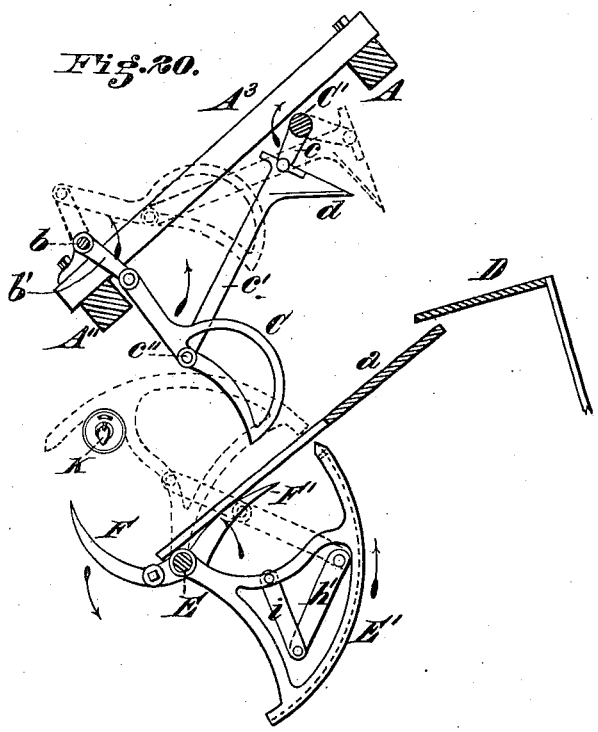
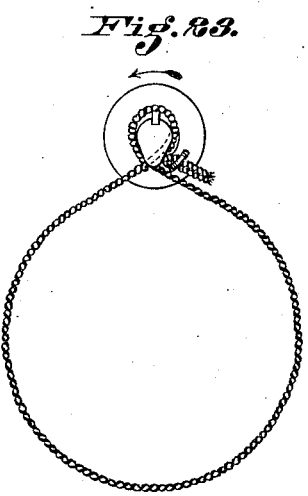
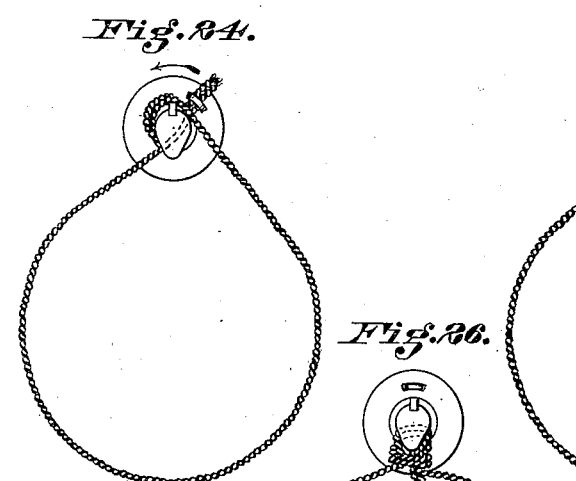
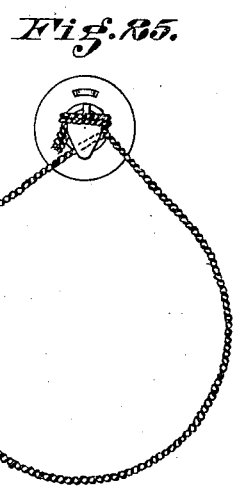
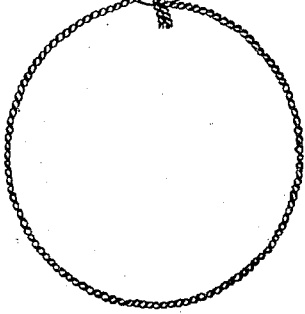
Attest
Jno. E. Jones
Herbert P. Cook
Inventor
Robert Brown,
by Wood & Boyd,
his Attorneys
N. PETERS. Photo-Lithographer. Washington, D. C.

UNITED STATES PATENT OFFICE.

ROBERT BROWN, OF SPRINGFIELD, OHIO.

GRAIN-BINDER.

SPECIFICATION forming part of Letters Patent No. 266,087, dated October 17, 1882.

Application filed April 26, 1882. (Model.)

*To all whom it may concern:*

Be it known that I, ROBERT BROWN, a citizen of the United States, and a resident of Springfield, in the county of Clarke and State of Ohio, have invented certain new and useful Improvements in Grain-Binders, of which the following is a specification.

This invention relates to certain improvements in grain-binders, and has for its objects to provide novel and efficient means for operating packing-fingers, which serve to pack the grain into the binding-receptacle, to provide revolving raking-fingers to insure the delivery of the grain from the elevator to the packer-fingers, to provide an improved knot-tying mechanism and twine holding and severing devices, to provide an improved means for operating the binder-arm, and to provide a novel construction of compressor-finger and ejector. These objects I accomplish by the mechanism illustrated in the accompanying drawings, in which—

Figure 1 is a rear end elevation of my improved grain-binder. Fig. 2 is an outer side elevation of the same, showing the binder and guard-tables broken to permit a view of the mechanism hidden thereby. Fig. 3 is a side elevation of one of the combined spring compress and ejector fingers. Fig. 4 is a plan view of the same. Fig. 5 is an elevation showing a portion of one of the adjustable spring compress-fingers detached. Fig. 6 is a side elevation of one of the auxiliary combined rigid compress and ejector fingers. Fig. 7 is a side elevation of the wheel upon which is constructed the eccentric, showing also the segmental gear and a portion of the tripping devices whereby the operation of the binding mechanism is controlled. Fig. 8 is an elevation of the rim of the same. Fig. 9 is a transverse sectional eletion on line *x x*, Fig. 7. Fig. 10 is an elevation of the inside face of the driving clutch-wheel. Fig. 11 is a central vertical section of the same. Fig. 12 is a side elevation of twine-tension device and a part of the tripping mechanism which is operated thereby to stop and start the main driving and segmental gear-wheel to operate and stop the binding mechanism, showing the binding-table and frame upon which they are mounted broken and in section. Fig. 13 is a central sectional elevation of the twine-tension device. Fig. 14 is a side elevation, partially in section, of the knotting mechanism, showing the frame upon which it is mounted and the shaft whereby it is driven broken off. Fig. 15 is an elevation partly in section of the knotter, the jaw-operating rod or bar shown broken off at its rear end. Fig. 16 is an end elevation of the knotter. Fig. 17 is a broken central sectional elevation of the knotter, showing the bill-shaped jaw and the gripper and stripper bar. Fig. 18 is an elevation of one of the faces of the cam-grooved wheel for opening the knotter, in this instance that side of the wheel in which the crank-arm moves to operate the gripper and stripper bar. Fig. 19 is an elevation of the opposite face of the same cam-grooved wheel, in this instance that side in which the crank-arm moves to operate the catching, gripping, and conducting hook for holding and carrying the ends of the twine during the operation of tying the knot. Fig. 20 is a transverse sectional elevation of the binding-table, apron, and frame, showing the arrangement of the binder-arm, compress and ejector fingers, and the packers in combination with the knotter. Fig. 21 is an end view of the knotter, showing the first step in the operation of tying the two ends of twine, one end of the twine being held in the gripper (not shown) and the other still integral with the twine from the ball and ready for the cutting operation when the gripper and looper hook has advanced far enough in the revolution to catch hold of the two ends. Fig. 22 is a similar view showing the gripper and looper hook in progress of its first revolution, holding the two ends of twine between it and the mounting cylinder or roller. Fig. 23 is a similar view showing the gripper and looper hook in progress of its first revolution, firmly holding the two ends of the twine and winding the twine around the rigid knotter-arm to form the loop of the knot. Fig. 24 is a similar view showing the gripper and looper hook in progress of its second revolution, still holding the two ends of the twine, the gripper and stripper bar having during the preceding part of this revolution retracted, and permitting the ingress of the winding twine between its hooked end and the inner face of the bill-shaped jaw and now in position for advancing to close on the twine under the knotter-arm and strip it on its upper face. Fig. 25 is a similar view showing the two ends of twine released from the gripper and looper hook, the loop stripped and the bow part of the twine around the bundle of grain preparatory to drawing the twine off the knotter to form the knot. Fig. 26 is a similar view showing the last step in the knotting process, the ejector-fingers being supposed to be drawing on the bundle and pulling the knot taut.

A A A″ designate the sills of the frame supporting the binder mechanism. A′ designates one end piece of the frame, which forms a standard to which is attached a portion of the operative parts of the binder.

A⁵ designates a central bracket for supporting the binder-table. It is also the bracket on which is journaled the binder-arm shafts.

$a$ designates the binder-table.

B′ designates the main driving-wheel, keyed to shaft B, which is journaled in the frame-piece A′. Upon the shaft B is loosely mounted the segmental gear-wheel and its eccentric, which impart motion to the binding mechanism.

$b$ designates a crank-shaft, journaled in brackets upon the sill A″ and the frame-bars A³, which latter are vertically over the binder-table. Upon the shaft $b$ are mounted crank-arms $b'$, to which are pivoted packing-fingers C.

C′ designates a second shaft, journaled just above the horizontal line of shaft $b$, at the upper and inner side of the frame.

$c$ designates cranks; $c'$, connecting-rods pivoted thereon at one of their ends, their other ends being connected to the packing-fingers C by pivots $c''$.

The operation of the fingers driven by these parts is illustrated by Fig. 20, the dotted lines showing the fingers raised in position for a stroke, each finger being represented at one end of the stroke.

Upon the forward end of the connecting-rods $c'$ are the revolving raking-fingers $d$, which revolve with the cranks $c$, the shaft C′ being the axis of their motion. These fingers serve to carry the grain which falls on the apron D over the binder-table $a$ within reach of the packing-fingers C. Motion is imparted to the shaft C′ by sprocket-wheel and chain C″ connecting with continually-running sprocket-wheel C³, fast on shaft B. Crank-shaft $b$ is oscillated by means of link $d'$ and pivoted vibrating arm $d''$, the lower end of which arm rests upon the inner part, $e$, of the rim of the binder-wheel H to raise and hold the packing-fingers out of operative position upon the incoming grain during the act of binding and ejecting a bundle. A segment of this rim $e$ is removed to allow the lower end of said arm $d''$ to drop through, thereby lowering the packing-fingers into position for operation upon the grain.

E designates an oscillating shaft, upon which is mounted the binder-arm E′, and also the spring compressor-fingers F and rigid ejector-fingers F′. These fingers are made in two parts, the ejector-finger F′ being formed with a sleeve, $f^2$, secured to the shaft E, and with an arm, $f^3$, having a serrated face, $f'$, while the compressor-finger F has at its inner or heel end a serrated face, $f$, corresponding with that on the arm $f^3$, the fingers being united together by a bolt, $f^4$. This mode of joining the fingers permits the compressor-fingers to be adjusted with reference to the shaft E. In other respects these compressor and ejector fingers are of the usual construction.

F″ F″ designate ordinary holding and ejector fingers, also mounted on shaft E. Shaft E is driven by the segmental pinion G, which meshes with segmental gear G′, constructed on the wheel H. Wheel H is mounted loosely on shaft B.

$g$ designates a delay-surface on pinion G, sliding upon the rim $g'$ of wheel H, holding the shaft rigidly in position periodically.

$h$ designates a shaft provided at its front and rear ends respectively with cranks $h' h''$. Crank $h''$ connects with pitman I, which is connected by the ring I′ with the eccentric I″, made integral with wheel H for imparting intermittent motion to the shaft $h$. The binder-arm E′ is mounted loosely on shaft E, and is connected to crank $h'$ by link $i$. By mounting the ejector, compressor, and holder fingers rigidly and the binder-arm loosely on the same shaft the compressor and ejector fingers rock independently of and without affecting the binder-arm, which is operated intermittingly by the connection above described with the wheel H.

J designates the tension-sheave, journaled upon a hollow shaft, $j$, through the center of which the twine passes from the ball located in the ordinary way. $j'$ designates the twine passing from the center of the shaft $j$ through the eye $i'$ of the arm $j''$, which is pivoted to the face of sheave J, thence through a hole or opening, $i''$, in the rim of sheave J.

Around the hub of sheave J is coiled a spring, J′, the recoil of which winds the twine around the sheave J sufficient to take up the slack. The action of the packers in forming the bundle pulls the twine forward through the guide-eyes $k$ on the frame, turning sheave J and coiling its spring. The binder-arm also in moving forward continues this motion until the sheave J is turned, so that the twine, in passing out through the eye $i''$, is nearly in line with the twine passing through the eyes $k$ when the twine passes freely from off the ball to receive the bundle. The return of the arm E′ forms a slack, which is taken up by the recoil of the spring-sheave J J′, as before explained. The binder-arm E′ in carrying forward the twine lays it upon the jaw K, and passes it into a spring cord-holder, K′, which grips it and holds it taut.

K″ designates a bar reciprocated by means of the pivoted arm L, upon one end of which is mounted a friction-roller, $l$, which travels against the face of gear L'.

$l'$ designates one of the holding-jaws, which is held in position by a spring, $l''$, which spring allows the twine $j'$ to be pressed in between the end of the bar K'' and the jaw $l'$.

M designates a knife attached to the bar K'', which is pressed forward and held by a friction-roller, $l$, riding on the side of the gear L'.
$m$ represents a guard in front of knife M to hold the twine in position for the action of the knife, which in cutting moves forward between the parts $m$ $l'$.

$m''$ designates a spring for holding the arm L against the side of gear L'. The roller $l$ runs on the side of the gear-wheel L', and thereby the holder is kept closed; but by the roller entering a groove in the gear-wheel the holder is momentarily opened.
The jaw K is fixed upon the stationary rod N. It has a longitudinal central slot within which the reciprocating jaw N' is located, as shown in Fig. 17.

$n$ designates a bar connecting jaw N' with the bar $n'$. These parts are sustained in position by the frame $A^4$, attached to the sill A'' of the frame. Rod N is supported and held in position by the revolving sleeve $N^2$, which journals in the boxing $N^3$.
$N^4$ represents a suspending sleeve-bracket, in which the rod N is rigidly held.

Motion is imparted to the reciprocating jaw N' by means of bell-crank lever O, pivoted to the frame $A^4$, on the inner end of which lever is mounted a friction-roller, $o$, traveling in a cam-groove, $o''$, of the proper shape to give the desired intermittent reciprocating motion.

P designates a gear keyed to the sleeve $N^2$, which is driven by a gear, L', on shaft P''', journaled upon the frame $A^4$.

P' designates a collar, to which is attached a rod, $P^3$, which passes through a slot in the collar N'', by which it is revolved and journaled at one end by the revolving collar P' upon rod N.

Q designates a hook formed upon the forward end of rod or bar $P^3$. This hook Q revolves with the collar $N^2$, and it is projected forward to catch the two ends of the cord, and drawn backward to hold them against the face of collar $N^2$. The reciprocating motion of hook Q is obtained by means of the bell-crank lever or arm O', on one of which is mounted a friction-roller, $o'$, which travels in cam-groove Q', made in one face of the double-faced cam-wheel $Q^2$. The opposite end of crank-arm O' is attached to a collar, $q$.

Collar $q$ is made of a larger diameter than collar P', which it surrounds. This annular space between the two collars P' $q'$ forms a housing for the coiled spring $q'$, which is wound between an outwardly-projecting flange, $p$, on the collar P' and an inwardly-projecting flange, $p'$, of the collar $q$, which spring adapts the hook to engage twine of varying dimensions. The gear L' has twice the number of teeth as gear P, which causes the latter to travel twice around to one revolution of the wheel L, and consequently to each reciprocating motion of the holding and stripping jaw N' and the knife M. Shaft P''' is driven by gear R, which meshes with a similar gear on short shaft R', which is driven by the segmental pinion R'', which intermittingly engages the segmental gear $R^3$, constructed upon the periphery of the wheel H. I provide a tripping mechanism for automatically starting the binding mechanism by the weight or pressure of the grain upon the binding-twine, the pulley of which trips a catch and connects the binding mechanism with the driving-wheel in the following manner: On the inner face of the sprocket-wheel $C^3$, I provide a series of notches, $c''$.

S designates a spring-lever, attached to the inner face of the wheel H, upon one end of which lever is mounted a dog or bolt, $s$, which passes through the wheel H opposite the circular series of notches $c''$, and when tipped or released engages with one of said notches, forming a clutch to connect the said loose wheel H with the continuously-revolving fixed drive-wheel $C^3$, and through the said wheel H to impart motion to the operative mechanism, hereinbefore described.

S' designates a vertically-sliding spring-pressed block, mounted in the vertical frame-piece A', and upon the upper end of which a lug, $s'$, which projects through the frame-piece A and is adapted to engage with the lug $s''$, placed upon the free end of the arm S when reciprocating arm S' is brought up to its seat, so as to bring its lugs on a plane with the lugs on the arms.

$e''$ represents a spring for restoring the arm S' to its upper position, so that the lug $s'$ will engage with the lug $s''$ on the spring-arm S after the arm has been withdrawn to trip the clutching mechanism.

T designates a pin or stud arm, projecting inward from the spring-arm S' through the frame-piece A' and engaging with the pivoted trigger T' on the frame, the forward end of which engages with a catch or lug, $t$, on the face of the sheave J, which sheave, when revolved, brings its lug $t$ up against the trigger T', pulling down the spring-lever S', releasing the engagement of the lugs $s'$ $s''$, when the bolt $s$ is placed forward and engages with one of the notches $c''$.

The operation of my binder is as follows: First the twine is strung through the binder-arm, carried over the knotter-jaws K N', and held between the cord-holding jaws K'' $l'$, when the machine is ready for operation. The grain is delivered from the harvester on the binder-table. The oscillating packer-fingers push it downward against the compressor-fingers F. When a sufficient amount of grain is pressed upon the cord to pull the sheave J and trip the bolt $s$ the binding mechanism is set in motion. The binder-arm is first carried up over the cord-holder and the knotter-jaws, when hook Q is thrust forward by the cam-groove Q' and lever O' and catches the two ends of the twine which are to form the knot, and immediately recedes, holding the same firmly against the face of collar N². Knife M and cord-holder jaw K'' are then withdrawn, the arm L releasing the end of the cord. At that same instant the cord from the binder-arm drops into the space between the holder-jaws, when the knife and the holder-jaw K'' both advance, catch and sever the twine, holding the supply end between the holder-jaws for a new bundle, hook Q in the meantime being revolved, carrying the cut ends of the twine nearly once around the shank of the jaws K N'. At the instant the two ends of the twine carried by the hook Q are brought over the top of jaw N', completing one revolution, the said jaw is moved backward, the lower hook on jaw N' pulling the lower part of the loop of twine backward, permitting the upper half to slide onto the jaw K. The jaw N' continues to recede until the looping-hook has carried the twine around again, and this time into the opening between the jaws K N', the jaw N' receding still farther until its upper edge is certainly withdrawn from under the loop. Then it is immediately projected by the cam catching and gripping the two ends in the opening between the lower points of the jaws K N', and firmly holds the twine between the jaws, while the top of the jaw N' has pushed the top part of the loop over the jaw K, thus completing the knot. At or about the time the jaw N' is projected to complete the knot the looping-hook Q opens and drops the ends of the twine. At this instant the ejector-fingers are set in motion and press against the bundle and commence to eject the same, which pressure, with the expansion of the straw, draws the knot taut. At this instant the roller o passes into the depression t' of the cam O'', slackening the grip of the jaws K N', and allowing the discharge of the bundle by the action of the ejector-fingers. The operation is continued in a like manner in binding the second and succeeding bundles.

Having thus described my invention, what I claim is—

1. The combination of the crank C' and link mechanism b, b', c', and c with the packer fingers C, suspended upon the frame over the binding-table for pressing the grain into the binding-receptacle, substantially as described.

2. The combination of the crank C' and link mechanism b, b', c', and c with the packer-fingers C and the series of revolving raking-fingers arranged in front of and above the packer-fingers, substantially as described.

3. In a cord-knotter, the combination of a slotted stationary knotting bill-shaped jaw, upon whose shank the loop is formed, with a reciprocating jaw working in the slot of said bill-shaped jaw and operating to seize the ends and to push the loop from the bill-shaped jaw over the ends, substantially as herein set forth.

4. The combination, with the stationary jaw K, for receiving the loop, and reciprocating jaw N', for seizing the ends and shedding the loop, the hook Q, revolving around both the stationary and reciprocating jaws, and operating to catch, hold, and wind the twine, substantially as herein set forth.

5. In a grain-binder, the twine cutting and holding mechanism composed essentially of the reciprocating bar K'' and knife M, the spring-jaw l', and the guard m, substantially as herein set forth.

6. In a grain-binder, the binder-arm journaled loosely upon the shaft which carries the compresser and ejector fingers, combined with and operated by means of a secondary shaft, h, and the crank and link connections, substantially as herein set forth.

7. In a grain-binder the compressor-finger F, adjustably connected to the ejector F' by means of the serrated faces f f', said parts being united, as described, and carried by one shaft, substantially as herein set forth.

In testimony whereof I have hereunto set my hand in the presence of two subscribing witnesses.

ROBERT BROWN.

Witnesses:
JNO. E. JONES,
ANDREW SCOTT.